US012318793B2

(12) United States Patent
Marchand

(10) Patent No.: US 12,318,793 B2
(45) Date of Patent: Jun. 3, 2025

(54) ASSEMBLY COMPRISING A LIQUID DISPENSER AND A SUPPORT ELEMENT

(71) Applicant: M.G.L.F., Paris (FR)

(72) Inventor: Laurent Marchand, Paris (FR)

(73) Assignee: M.G.L.F., Paris (FR)

( * ) Notice: Subject to any disclaimer, the term of this patent is extended or adjusted under 35 U.S.C. 154(b) by 106 days.

(21) Appl. No.: 18/078,651

(22) Filed: Dec. 9, 2022

(65) Prior Publication Data

US 2023/0107438 A1 Apr. 6, 2023

Related U.S. Application Data

(63) Continuation of application No. PCT/FR2021/051028, filed on Jun. 8, 2021.

(30) Foreign Application Priority Data

Jun. 9, 2020 (FR) ..................................... 20/06020

(51) Int. Cl.
*B05B 11/00* (2023.01)
*A47K 5/12* (2006.01)
*B05B 15/62* (2018.01)

(52) U.S. Cl.
CPC ........ *B05B 11/0038* (2018.08); *A47K 5/1205* (2013.01); *B05B 15/62* (2018.02); *A47K 2201/02* (2013.01)

(58) Field of Classification Search
CPC ............ B05B 11/0038; B05B 11/0054; A47K 5/1208; B67D 3/0029
USPC ...... 220/694; 224/404, 414, 42.13; 222/180, 222/181.3, 105
See application file for complete search history.

(56) References Cited

U.S. PATENT DOCUMENTS

2009/0120963 A1* 5/2009 Bae ..................... B05B 11/1069 222/153.13
2013/0092708 A1 4/2013 Geiberger
2019/0201925 A1* 7/2019 Toh ...................... A47K 5/1211

FOREIGN PATENT DOCUMENTS

JP 2009269651 11/2009
WO 2020064039 4/2020
WO WO2020099379 * 5/2020 ........... A47K 5/1205

OTHER PUBLICATIONS

International Search Report issued in corresponding International Application PCT/FR2021/051028, mailed Sep. 17, 2021.

(Continued)

*Primary Examiner* — Paul R Durand
*Assistant Examiner* — Michael J. Melaragno
(74) *Attorney, Agent, or Firm* — Burris Law, PLLC

(57) ABSTRACT

An assembly includes a dispenser having a lower body including a bottom from which there extends a lower skirt, wherein the lower skirt there is fitted and an upper body including a neck, a pump adapted to be fixed in the neck, from the neck extends an upper skirt adapted to fit on the lower skirt, the lower body and the upper body defining a cavity in which a liquid pouch can be placed, the assembly comprising a support element comprising a wall-fixing plate to which a fixing base is fixed, the bottom comprising a bottom wall that is arranged around at least a part of the perimeter of the bottom and extends in the opposite direction to the lower skirt, forming an open housing, the bottom being provided with a connection device to the support element.

10 Claims, 5 Drawing Sheets

(56) References Cited

OTHER PUBLICATIONS

Office Action issued in corresponding JP Application 2022-575342, issued Apr. 8, 2025, and English translation thereof, 9 pages.

* cited by examiner

14

ASSEMBLY COMPRISING A LIQUID DISPENSER AND A SUPPORT ELEMENT

CROSS-REFERENCE TO RELATED APPLICATIONS

This application is a continuation of International Application No. PCT/FR2021/051028, filed on Jun. 8, 2021, which claims priority to and the benefit of French Patent Application No. FR 20/06020 filed on Jun. 9, 2020. The disclosures of the above applications are incorporated herein by reference.

FIELD

The present disclosure relates to an assembly comprising a liquid dispenser and a support element.

BACKGROUND

The statements in this section merely provide background information related to the present disclosure and may not constitute prior art.

The liquid dispensers are well known from the prior art. Indeed, there are liquid dispensers in many rooms of public or private buildings, such as a kitchen, a bathroom or a toilet.

The liquid dispensers generally consist of a body containing the liquid or a bag of liquid and a dip tube allowing to pump the liquid contained in the body of the dispenser or in the bag of liquid.

These dispensers can be fixed on any surface, in one form on a wall, by means of a support element or not.

However, the dispensers of the prior art have drawbacks.

T known dispensers, when they are on their support element, offer an unharmonious aesthetic appearance.

Indeed, the support element remains very visible when the dispenser is installed and the cooperation between the support element and the dispenser clearly shows two distinct elements which are the support element and the dispenser.

As a result, such dispensers appear more cumbersome in the room in which they are installed.

In addition, when a user wishes to change the soap bag, difficulties are experienced in dismantling the dispenser.

Indeed, in the dispensers of the prior art, the support element must be uncoupled from the dispenser in order to be able to integrate a new bag of soap. In addition, the dispenser itself must be completely disassembled to integrate the replacement fluid bag.

The same applies to the support element when a user wishes to displace the dispenser.

This results in a waste of time for these users.

SUMMARY

This section provides a general summary of the disclosure and is not a comprehensive disclosure of its full scope or all of its features.

The present disclosure provides an assembly comprising a dispenser comprising a lower body comprising a bottom from which extends a lower skirt on which is engaged an upper body comprising a neck, a pump being adapted to be fixed in the neck, the neck of which extends an upper skirt adapted to be engaged on the lower skirt, the lower body and the upper body delimiting a cavity in which a bag of liquid can be placed, the assembly comprising a support element comprising a wall fixing plate to which is fixed a fixing base, the bottom comprising a bottom wall arranged on at least part of the periphery of the bottom and extending in the opposite direction to the lower skirt, forming an open housing, the bottom being provided with a means of connection to the support element.

According to an aspect, the present disclosure relates to an assembly characterized in that it comprises a dispenser comprising:

(i) a lower body comprising a bottom from which extends a lower skirt, the lower body around which is engaged (ii) an upper body comprising a neck, a pump being adapted to be fixed in the neck, the neck of which extends an upper skirt adapted to engage the lower skirt so that the upper skirt surrounds the lower skirt of the lower body, the lower body and the upper body delimiting a cavity in which a bag of liquid can be placed, the assembly comprising a support element comprising a wall fixing plate to which is fixed a fixing base, the assembly comprising a bottom wall arranged on at least part of the periphery of the bottom and extending in projection from the bottom in the direction opposite to the lower skirt, the wall forming an open housing adapted to receive the fixing base, the bottom being provided with means of connection, as set forth herein, to the support element, and the bottom wall being arranged so as to surround the fixing base when the fixing base is inserted into the housing formed by the bottom wall.

It should be understood that the upper body is adapted to be engaged on the lower body so as to surround the lower body.

Thanks to the present disclosure, it is possible to quickly replace the bag of liquid. Indeed, when the dispenser is mounted on the support element via the fixing base which is introduced into the open housing, it suffices to remove the upper body which surrounds the lower body only to be able to have access to the bag of liquid.

Moreover, the aesthetics of the assembly is improved, in fact, the bottom wall makes it possible to camouflage the fixing base when the fixing base is introduced into the housing formed by the bottom wall.

According to one form, the housing is located on an outer surface of the bottom of the dispenser, the support element being configured to be introduced into the housing in a form form-fitting manner.

In one variation, the fixing base is configured to be introduced into the housing in a form-fitting manner.

According to one form, the fixing base is arranged transversely with respect to a longitudinal extension axis of the upper body, and the wall fixing plate extending parallel to the longitudinal extension axis of the upper body when the support element is introduced into the housing, the wall fixing plate comprising orifices configured to receive fixing elements.

In one variation, when the fixing base is introduced into the housing.

According to one form, the fixing base and the wall fixing plate of the support element are molded together.

According to one form, the fixing base and the wall fixing plate of the support element are welded together.

According to one form, a height formed by the fixing base of the support element is configured to correspond to a height formed by the housing via the lower skirt, so that the fixing base is superimposed with respect to the bottom.

According to one form, the fixing base of the support element comprises a central orifice configured to fix the fixing base of the support element to the bottom of the lower body by a fixing device, the bottom of the lower body of the dispenser also comprising a central orifice arranged opposite the central orifice of the fixing base of the support element when the dispenser cooperates with the support element.

According to one form, the outer surface comprises a first row of grooves uniformly distributed over the periphery of the surface, the fixing base of the support element comprising tenons configured to be inserted into the corresponding first row of grooves.

According to one form, the outer surface comprises a second row of grooves uniformly distributed so as to fill a space between each groove of the first row of grooves, the second row of grooves being arranged closer to the central orifice than the first row of grooves.

According to one form, the fixing base of the support element comprises lumens uniformly distributed between the central orifice of the fixing base and the tenons.

These lumens allow, during the cleaning of the dispenser, the evacuation of a liquid used for cleaning the dispenser.

According to one form, the lower body and the upper body have a reversible connecting device, in one form a reversible connection means allowing the upper body to be removed from the lower body to replace the bag of liquid, the reversible connecting means comprising a lower body thread formed in the lower body and a complementary thread formed in the upper body.

The present disclosure also concerns a liquid dispenser comprising a lower body comprising a bottom from which extends a lower skirt on which is engaged an upper body comprising a neck, a pump being adapted to be fixed in the neck, from which extends an upper skirt is adapted to be engaged on the lower skirt, the lower body and the upper body delimiting a cavity in which a bag of liquid can be placed, the bottom being provided with a connection device, in one form a connection means to a wall support element.

According to one form, the lower body and the upper body have the reversible connection device allowing the upper body to be removed from the lower body to replace the bag of liquid.

According to one form, the reversible connection device comprise a bottom thread formed in the lower body and a complementary thread formed in the upper body.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
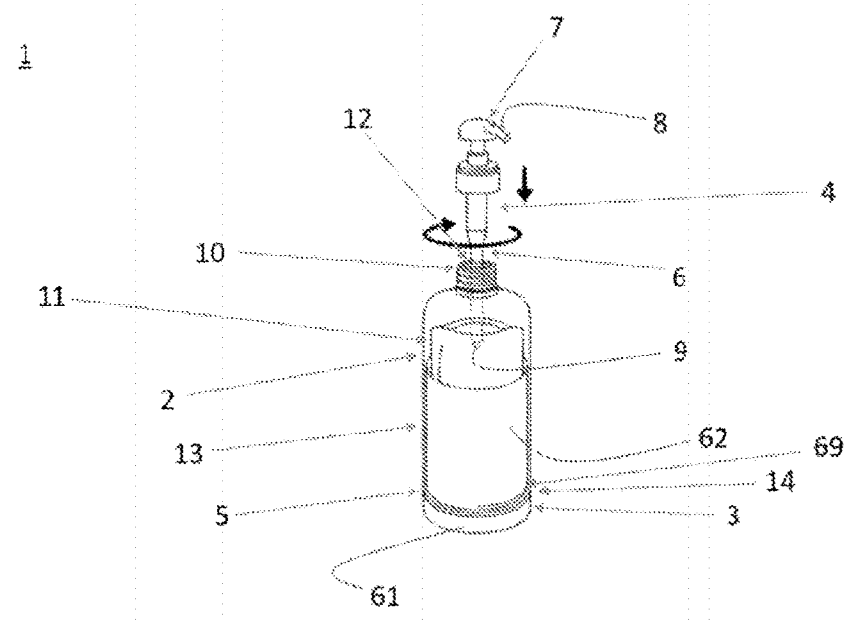
FIG. 1 shows a perspective view of the liquid dispenser, in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a dispenser of an assembly according to the present disclosure.

The liquid dispenser 1 comprising a lower body 14 comprising a first end comprising a bottom 3, an upper body 2 and a pump 4.

Figure 9:
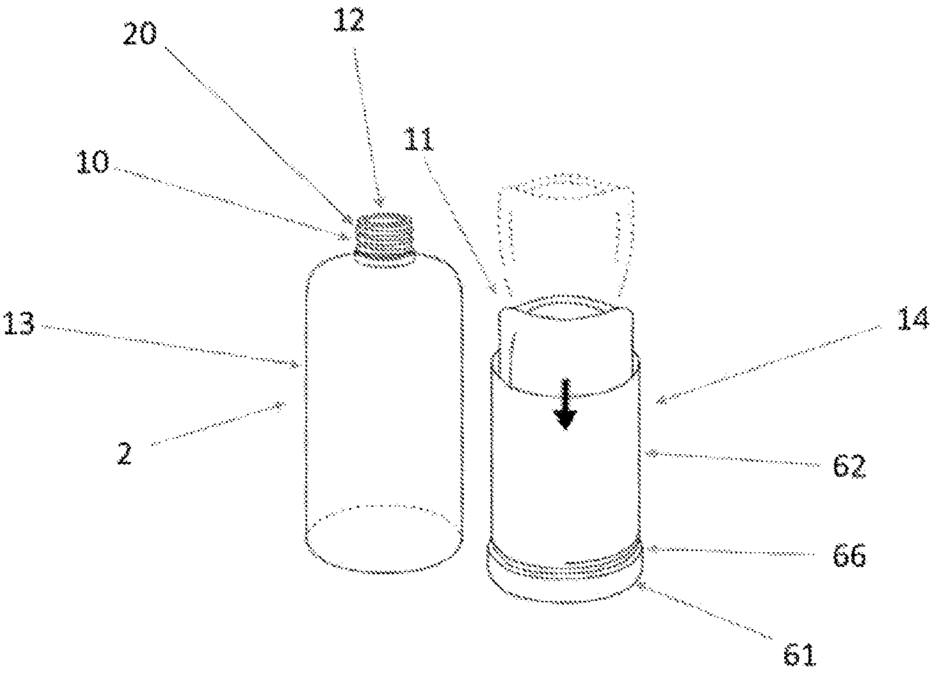
FIG. 9 shows a partial perspective view of the dispenser illustrating a mode of introduction and/or extraction of a bag of liquid from the dispenser, in accordance with teachings of the present disclosure.

As illustrated in FIG. 9, the upper body is configured to be engaged on the lower body. The upper body is configured to extend around the lower body when engaged on the lower body.

The upper body 2 is configured to be screwed onto the lower body 14.

For this purpose, the upper body may comprise a thread arranged on an inner wall of the upper body. In one variation, the thread is arranged on an end portion of the upper body.

The lower body may comprise a thread, arranged on an outer wall of the lower body. In one variation, the thread is arranged on the portion of the first end of the lower body 14, adjacent to the bottom 3 of the lower body 14.

Figure 2:
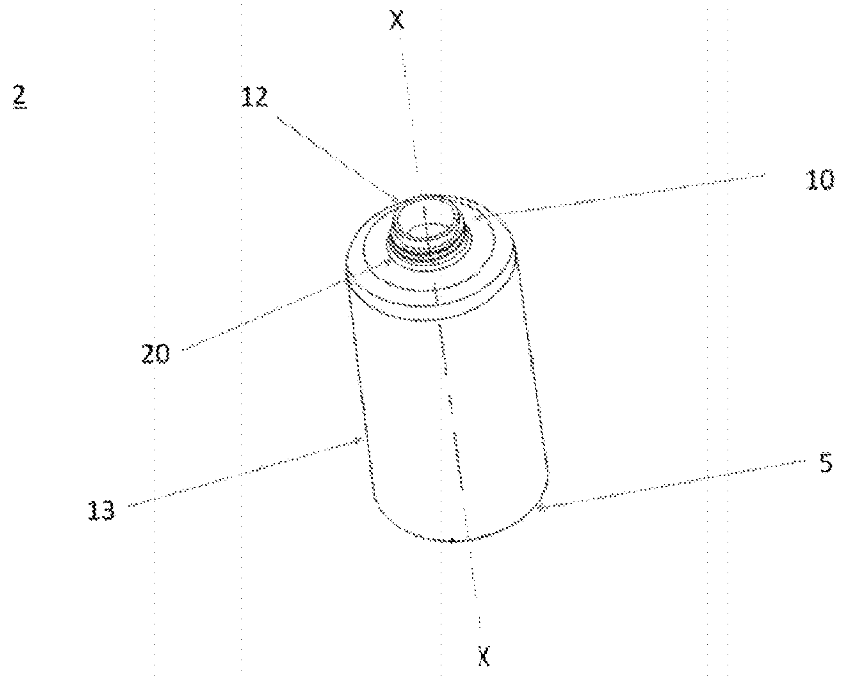
FIG. 2 shows a perspective view of the upper body of the dispenser, in accordance with the teachings of the present disclosure.

The upper body 2 comprising an upper skirt 13 extending along a longitudinal axis of extension XX, as shown in this figure and in FIG. 2.

The upper body 2 and the lower body 14 are cylindrical in shape.

Of course, this cylindrical shape does not limit the present disclosure. Indeed, this shape can also be, for example, cubic, pyramidal or prismatic.

The pump 4 comprises, on a first pump end, a dip tube 6 and on a second pump end, opposite the first pump end, a push button 7.

According to another form, the pump 4 comprises two parts, a first part comprising the dip tube 6 and a second part comprising the push button 7, the first part and the second part being configured to clip onto one another.

In one variation of the pump 4, the push button 7 comprises a spout 8.

The dip tube 6 comprises a cutting element 9 configured to be introduced inside the upper body 2 through an orifice 12.

Indeed, the pump 4 is configured to be screwed onto the upper body 2, at the level of the orifice 12 arranged on a second end of the upper body, opposite to the first end of the upper body 5, as illustrated in this figure.

A bag of liquid, here of soap 11, is introduced into the lower body 14 of the dispenser 1, delimited by the bottom 3 and the lower skirt 62.

Of course, the soap bag 11 does not limit the present disclosure.

The soap bag 11 can be replaced by a bag containing any washing gel or emulsion for the body, the hair or the hands, for example a hydro-alcoholic solution or any other liquid for cleaning and/or moisturizing the parts of the body.

The bag can comprise a label including legal notices of cosmetic traceability of the bag and its container, such as the name of the liquid contained in the bag in different languages, the INCI formulas (ingredients of the cosmetic formula) and the manufacturing batch number.

The cutting element 9 of the dip tube 6 of the pump 4 is configured to pierce the soap bag 11, when the bag 11 is introduced into the lower body 2 of the dispenser 1 and when the pump 4 is screwed at the level of the second end of the upper body 2.

FIG. 2 shows the upper body 2 of the dispenser 1.

The upper body 2 of the dispenser 1 comprises an upper skirt 13 extending along a longitudinal axis of extension XX as shown in this figure, whose first end of the upper body 5 is configured to receive the lower body 14, and in one form the bottom 3 and the second end of the upper body, corresponding to a neck 10, is configured to receive the pump 4.

The neck 10 comprises the orifice 12.

The neck 10 comprises on its periphery, a neck thread 20 allowing the pump 4 to be screwed onto the neck 10, the dip tube 6 passing through the orifice 12.

Figure 3:
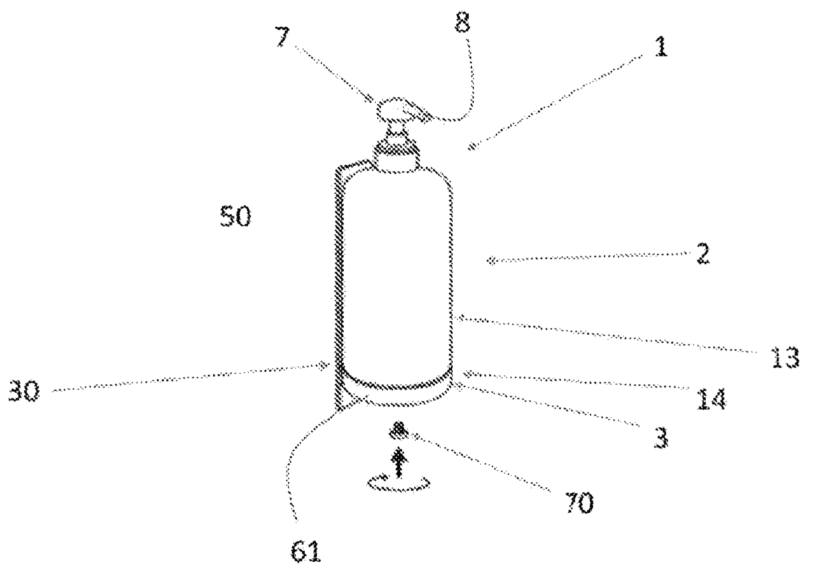
FIG. 3 shows a perspective view of the dispenser on a support element, in accordance with the teachings of the present disclosure.

FIG. 3 shows the dispenser 1 on a support element 30.

Figure 4:
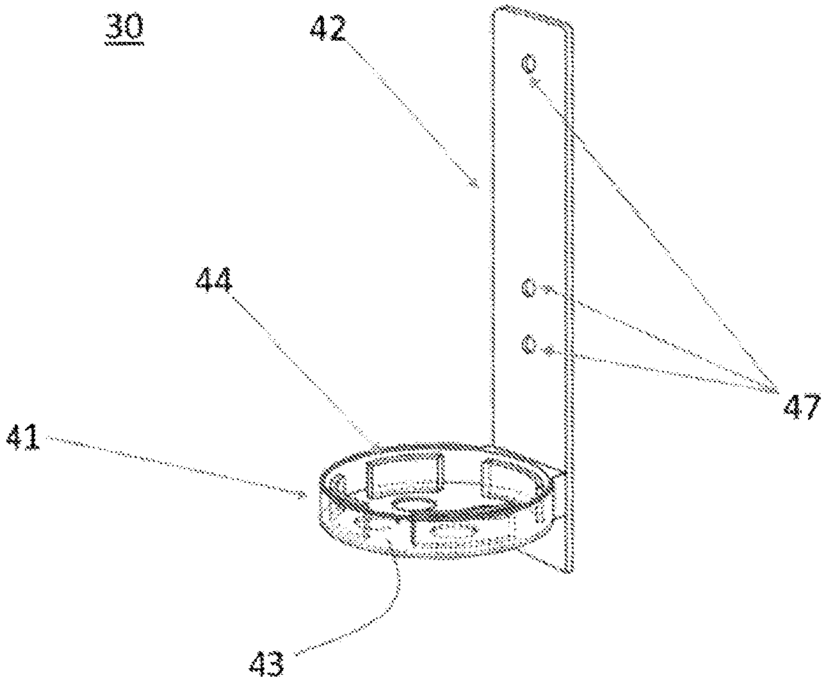
FIG. 4 shows a perspective view of the support element of the dispenser, in accordance with the teachings of the present disclosure.

The support element 30 comprises two parts, as shown in FIG. 4.

Referring to FIG. 4, the support element 30 comprises a fixing base 41 and a wall fixing plate 42.

The fixing base 41 is arranged along an axis transverse to the longitudinal axis XX of the upper body 2 when the support element 30 cooperates with the dispenser 1 and the wall fixing plate 42 is arranged parallel to the longitudinal axis XX when the support element 30 cooperates with the dispenser 1.

The fixing base 41 and the wall fixing plate 42 of the support element 30 are secured to each other.

In one variation, the fixing base 41 and the wall fixing plate 42 of the support element 30 are molded to each other.

In form, the fixing base 41 and the wall fixing plate 42 of the support element 30 are welded to each other.

Of course, the securing of the fixing base 41 and the wall fixing plate 42 can be achieved by any known fixing elements.

The fixing base 41 is configured to cooperate with the lower body 14 and in one form with the bottom 3 of the dispenser 1.

The spatial shape of the fixing base 41 is therefore dependent on the spatial shape of the bottom 3.

In the one form, the fixing base 41 is circular in shape.

The fixing base 41 of the support element 30 comprises a base wall 43 extending parallel with respect to the longitudinal extension axis XX of the upper body 2, on the periphery of the fixing base 41 of the support element 30.

Tenons 44 are arranged at the periphery of the fixing base 41 of the support element 30.

These tenons 44 extend, like the base wall 43, parallel to the longitudinal axis of extension XX of the upper body 2, when the support element 30 cooperates with the dispenser 1.

Figure 5:
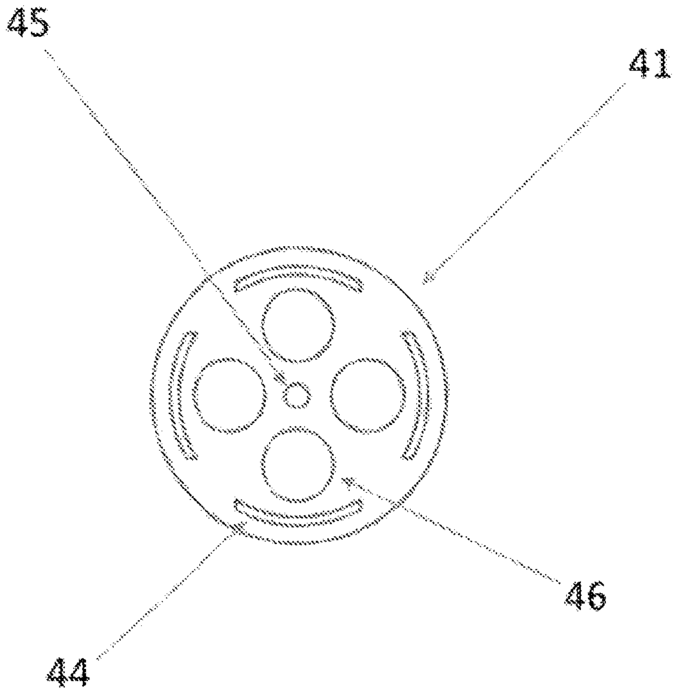
FIG. 5 shows a perspective top view of the fixing base of the support element, in accordance with the teachings of the present disclosure.

The fixing base 41 comprises a central orifice 45 configured to fix the fixing base 41 of the support element 30 removably to the bottom 3 of the lower body 14, as represented in FIG. 5.

Lumens 46, of circular shape in one variation, are arranged between the central orifice 45 and the tenons 44.

Of course, this circular shape does not limit the present disclosure. Indeed, this shape can also be, for example, square or triangular.

As shown in FIG. 5, the tenons 44 are distributed uniformly around the periphery of the fixing base 41 of the support element 30.

More precisely, four tenons are distributed uniformly at the level of the periphery of the fixing base 41 of the support element 30.

The lumens 46 are for their part distributed uniformly between the central orifice 45 and the tenons 44.

More precisely, four lumens 46 are distributed uniformly between the central orifice 45 and the tenons 44.

Returning to FIG. 4, the wall mounting plate 42 of the support element 30, arranged parallel to the longitudinal axis XX when the support element 30 cooperates with the dispenser 1, is arranged as a flat rectangular bar, as shown in this figure.

Of course, this arrangement does not limit the present disclosure.

The wall fixing plate 42 comprises orifices 47 configured to receive fixing elements, the wall fixing plate 42 being configured to be fixed to a surface, in one variation a wall 50, as represented in FIG. 3. The fixing elements, not shown, may be of the screw type.

Of course, any other known fixing elements are not to be excluded.

Figure 6:
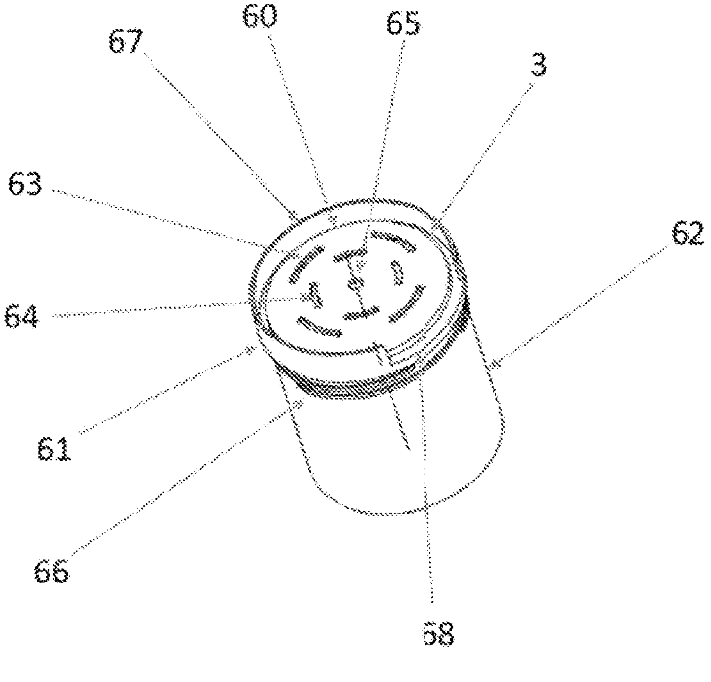
FIG. 6 shows a perspective view of the lower body of the dispenser, in accordance with the teachings of the present disclosure.

FIG. 6 shows the lower body 14 configured to be screwed onto the first end of the body 5 of the upper body 2 and to cooperate with the fixing base 41 of the support element 30.

The bottom 3 comprises an outer surface 60, configured to cooperate with the fixing base 41 of the support element 30.

The lower body of the dispenser comprises a bottom wall 61 which is arranged on at least part of the periphery of the bottom 3.

The bottom wall extends from the bottom and protrudes from the bottom 3 in the opposite direction to the lower skirt 62. The wall forms an open housing 67 are adapted to receive the fixing base 41.

The lower body 14 comprises the bottom wall 61 arranged on at least part of the periphery of the bottom 3 and extending longitudinally along an axis parallel to the axis of longitudinal extension XX of the upper body 2 of the dispenser 1, when the upper body 2 and the lower body 14 are screwed together.

More precisely, the bottom wall 61 extends longitudinally in a direction opposite to the introduction of the lower body 14 on the upper body 2 of the dispenser 1.

The bottom 3 is provided with various connection devices (set forth in greater detail below) to the support element 30, and the bottom wall is arranged so as to surround the fixing base when the fixing base is inserted into the housing formed by the bottom wall.

The configuration of the bottom wall makes it possible to conceal the fixing base when the fixing base is introduced into the housing formed by the bottom wall.

A lower skirt 62 also extends along a longitudinal axis parallel to the longitudinal extension axis XX of the upper body 2 of the dispenser 1, when the upper body 2 and the lower body 14 are screwed together.

However, the lower skirt 62 extends longitudinally in the direction of insertion of the lower body 14 into the upper body 2 of the dispenser 1.

The outer surface 60 of the bottom 3 comprises a connection device, here a first row of grooves 63 arranged on the periphery of this outer surface 60 of the bottom 3.

More precisely, these grooves are distributed uniformly at the level of the periphery of the outer surface 60 and are four in number.

The outer surface 60 of the bottom 3 also comprises a second row of grooves 64.

The outer surface 60 also comprises a central orifice 65.

The second row of grooves 64 is evenly distributed so as to fill a space between each groove of the first row 63, the second row of grooves 64 being disposed closer to the center of the bottom 3 than the first row of grooves 63.

A reversible connection device is arranged at the level of the lower body 14 and at the level of the upper body 2.

Indeed, the reversible connection device in this form comprises a lower body thread 66 arranged on the periphery of the lower body 14 and a complementary thread 69, visible in FIG. 1, is arranged on the periphery of the upper body 2, and more precisely at the level of the first end of the body 5 of the upper body 2, allowing the screwing of the upper body 2 on the lower body 14 of the dispenser 1.

A housing 67 is defined and formed between the bottom wall 61 and the outer surface 60 of the bottom 3.

A notch 68 is made on the bottom wall 61 of the lower body 14 so that the support element 30 can be introduced into the housing 67 of the lower body 14.

Figure 7:
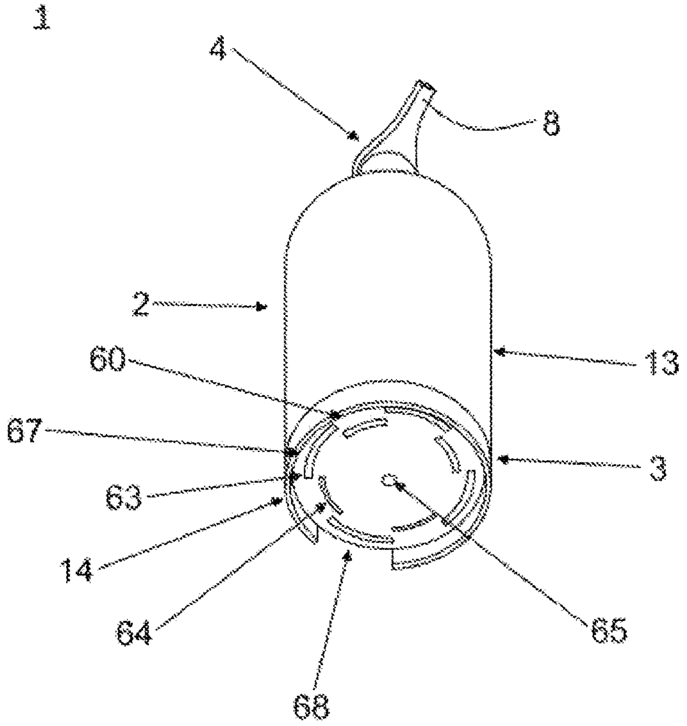
FIG. 7 shows a perspective bottom view of the dispenser, without its support element, in accordance with the teachings of the present disclosure.
Figure 8:
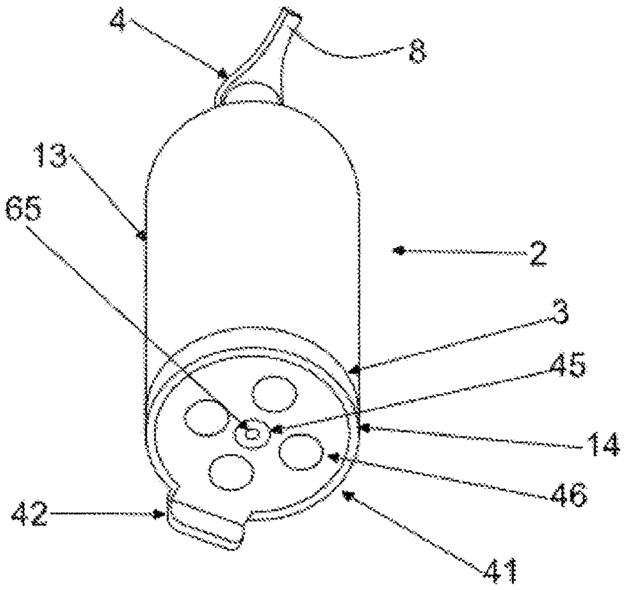
FIG. 8 shows a perspective bottom view of the dispenser, cooperating with its support element, in accordance with the teachings of the present disclosure.

As shown in FIG. 7, the dispenser 1 does not rest on its support element 30, unlike the illustration of FIG. 8 in which the dispenser 1 rests on its support element 30 and in one form on the fixing base 41 of the support element 30.

The height of the fixing base 41 of the support element 30, as shown in FIG. 8, corresponds to the height of the housing 67.

Indeed, the support element 30 is configured to be introduced into the housing 67 in a form-fitting manner.

More precisely, it is the fixing base 41 of the support element 30 which is configured to be introduced into the housing 67 in a form-fitting manner, the fixing base 41 being superimposed with the bottom 3 of the dispenser 1

Furthermore, the fixing base 41 is flush with the bottom wall 61.

The central orifice 45 of the fixing base 41 of the support element 30 is therefore facing the central orifice 65 of the bottom 3 when the fixing base 41 is inserted into its housing 67 so as to fix the support element 30 with the dispenser 1 by a fixing device 70.

The fixing device 70 in one form can be of the screw type, as shown in FIG. 3.

Of course, any other known fixing devices are not to be excluded.

In the following passages, the operation of the present disclosure is detailed.

It should be noted that the liquid bag, illustrated as a soap bag 11, must be replaced once it is empty because it cannot be refilled, which guarantees anti-bacterial hygiene of the dispenser and traceability of the liquid bag, and provides compliance with the regulations inherent in the liquid contained in the bag.

When a user wishes, in one form, to replace the soap bag 11 of the dispenser 1 which is, in one variation, fixed to its support element 30 via the lower body 14 and the fixing base 41 of the support element 30, the support element 30 being itself fixed to a wall 50 via the wall fixing plate 42, the user simply has to unscrew the upper body 2 of the dispenser 1 from the lower body 14.

The empty soap bag 11, present in the lower body 14 of the dispenser 1, as shown in FIG. 9, is therefore replaced by a new soap bag 11, introduced into the lower body 14 and supported by the upper skirt 62 and the bottom 3.

The upper body 2 of the dispenser 1 can therefore be screwed back onto the lower body 14, the cutting element 9 of the dip tube 6 of the pump 4 piercing the soap bag 11 so that when the user exerts a pressure force on the push button 7 of the pump 4, the soap can be sucked up to come out through the spout 8.

According to one form, the pump 4 must be unscrewed before screwing the upper body 2 back onto the lower body 14 of the dispenser 1 in order to then be screwed back 30 into the neck 10 of the upper body 2 so that the cutting element 9 can pierce the soap bag 11, more precisely and more cleanly.

When a user wishes to uncouple the dispenser 1 from its support element 30, the latter begins by removing the fixing device 70 fixing the fixing base 41 of the support element 30 to the bottom 3 of the dispenser 1.

The user only has to take control of the dispenser 1 so that the tenons 44 of the fixing base 41 no longer cooperate with the corresponding first row of grooves 63.

When a user wishes to displace the support element 30 of the dispenser 1, to fix it to another wall 50 in one variation, the latter begins by removing the fixing elements from the orifices 47 arranged on the wall fixing plate 42 of the support element 30 to reinsert them through the same orifices 47 on another wall 50.

The advantages conferred by this dispenser 1 and its support element 30 are therefore as follows:

The dispenser 1 can be fixed to a wall 50 without assembly difficulties and has a harmonious visual appearance as well as an improved layout, in one form in an interlocking manner between the dispenser 1 and its support element 30.

In addition, recharging the dispenser 1 with a new soap bag 11 is quick and accessible to all users.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An assembly comprising:

a dispenser comprising:

a lower body comprising a bottom and a lower skirt extending from the bottom, wherein the lower body is engaged around the lower skirt; and an upper body comprising a neck and a pump adapted to be fixed to the neck, an upper skirt extending from the neck and adapted to be engaged on the lower skirt so that the upper skirt surrounds the lower skirt of the lower body, wherein the lower body and the upper body delimit a cavity adapted to receive a bag of liquid;

a support element comprising a wall fixing plate fixed to a fixing base; and a bottom wall arranged on at least part of a periphery of the bottom of the dispenser and extending in projection from the bottom of the dispenser in the opposite direction to the lower skirt, the bottom wall forming an open housing adapted to receive the fixing base, wherein the bottom of the dispenser is provided with a connection device to the support element, and the bottom wall is arranged so as to surround the fixing base when the fixing base is inserted into the open housing formed by the bottom wall.

2. The assembly according to claim 1, wherein:

the open housing is located on an outer surface of the bottom of the dispenser, and the fixing base is adapted to be introduced into the open housing in a form-fitting manner.

3. The assembly according to claim 1, wherein:

the fixing base is arranged transversely with respect to a longitudinal extension axis of the upper body, the wall fixing plate extends parallel to the longitudinal extension axis of the upper body when the fixing base is introduced into the open housing, and the wall fixing plate comprises orifices adapted to receive fixing elements.

4. The assembly according to claim 1, wherein the fixing base and the wall fixing plate of the support element are molded together.

5. The assembly according to claim 1, wherein a height formed by the fixing base of the support element is adapted to correspond to a height formed by the opening housing via the lower skirt, so that the fixing base is superimposed with respect to the bottom of the dispenser.

6. The assembly according to claim 1, wherein:

the fixing base of the support element comprises a central orifice adapted to fix the fixing base of the support element on the bottom of the dispenser by a fixing device, and the bottom of the dispenser comprises a central orifice arranged opposite the central orifice of the fixing base of the support element when the dispenser cooperates with the support element.

7. The assembly according to claim 6, wherein the outer surface comprises a first row of grooves distributed uniformly over the periphery of the surface, the fixing base of the support element comprising tenons adapted to fit into a corresponding first row of grooves.

8. The assembly according to claim 7, wherein:

the outer surface comprises a second row of grooves uniformly distributed so as to fill a space between each groove of the first row of grooves, and the second row of grooves being arranged closer to the central orifice than the first row of grooves.

9. The assembly according to claim 7, wherein the fixing base of the support element comprises lumens distributed uniformly between the central orifice of the fixing base and the tenons.

10. The assembly according to claim 1, wherein:

the lower body and the upper body have a reversible connection device allowing the upper body to be removed from the lower body to replace the liquid bag, and the reversible connection device comprises a lower body thread formed in the lower body and a complementary thread formed in the upper body.

* * * * *